Patented Apr. 30, 1935

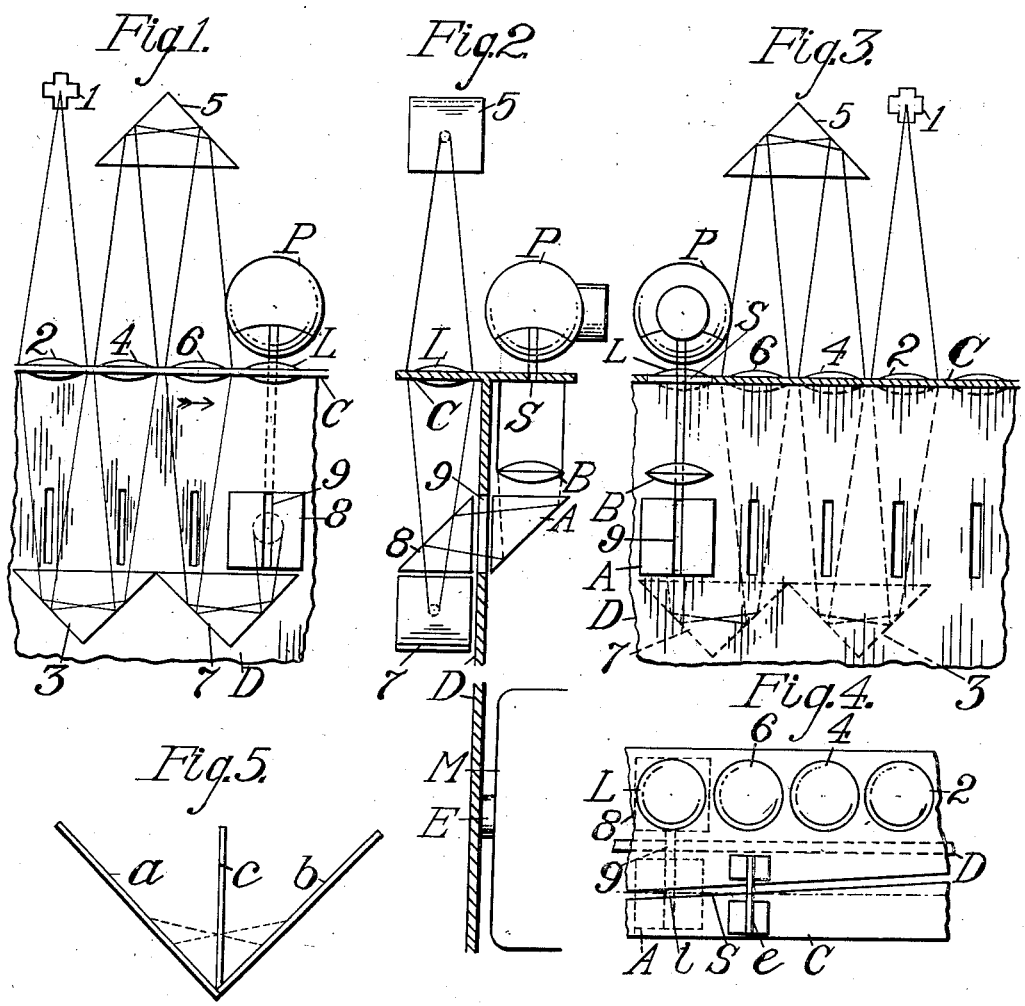

1,999,867

UNITED STATES PATENT OFFICE 1,999,867

TELEVISION APPARATUS

Aloysius J. Cawley, Pittston, Pa.

Application May 14, 1931, Serial No. 537,244

17 Claims. (Cl. 178—6)

The invention relates to scanning apparatus for television purposes, and is intended to apply to means for transmitting images, pictures, writing, and the like, by means of wire or wireless apparatus. One of the objects is the production of the most finely grained image by the use of a single rotating medium which is provided with a plurality of light modulating means. Such modulating means has heretofore been carried on a plurality of rotating media, and the present invention aims to dispense with all but one of such media.

Such a single rotating medium may assume many different forms in carrying out the invention in practice, and it is to be distinctly understood that the type of medium described and illustrated is merely one of many forms that are covered by the appended claims.

This application is a continuation in part application of my applications Serial Number 468,117, filed July 15, 1930 for Television apparatus, Serial Number 473,660, filed August 7, 1930, for Scanning apparatus and Serial Number 513,373, filed February 4, 1931, for Reflex television system.

One of the light modulating media carried on the rotating medium acts to speed up the rate of traversal of the image, another acts to interrupt the light to give a chopper effect and a third brings about a slow shifting of the position of the light beam.

The invention will be more thoroughly understood from the following description of a specific embodiment when read in connection with the accompanying drawing, in which Figure 1 is an elevational side view of the apparatus.

Figure 2 is an elevational view in cross section partly of the apparatus, the section being taken on a line passing through the slot 9 of Figure 1.

Figure 3 is a side elevational view of the apparatus, being the side opposite that illustrated in Figure 1.

Figure 4 is a plan view of the apparatus as illustrated in Figure 3.

Figure 5 is a side elevational view of a special modification of the reflecting means forming part of the invention.

In Figure 1, D is a disk which is mounted upon a shaft and which is firmly attached to cylinder C. The two elements just mentioned may be referred to as a single disk-cylinder rotating element. This disk-cylinder rotates at a definite speed, and is the only element that rotates in the apparatus. The disk D is attached in the middle portion of cylinder C. $l$ is the object or an image of the object, as desired. Cylinder C rotates to the right; lenses 2, 4, etc., therefore are moved to the right. Lens 2 forms an image in the prism 3 and also moves the light to the right at a rate equal to that of the movement of the cylinder C. This is described in the above applications. The prism 3 reflects the light back through the adjacent lens 4, and incidentally causes the light to move in a direction opposite to that of the cylinder C. Lens 4 moves through this reflected light and causes the reformation of an image in prism 5, as described in the previous applications. The light which has traversed lens 4 will be found to move to the right with a speed that is greater than that of the cylinder. Similarly, lens 6 will traverse the light which has been reflected from prism 5 and which has had its direction of motion reversed thereby, in a direction opposite to that of the movement of the light. The light, after it has traversed lens 6 is found to be moving to the right at a still greater speed than that of the cylinder C. Again, an image is formed in prism 7, and the light leaving this prism is found to have had its direction of motion reversed, so that it is moving to the left. It enters prism 8, which reflects it downward in the plane of the drawing from the observer. This throws the light beam upon the disk D at the exact area which is repeatedly traversed by the light slots 9, or their equivalents, which may be lenses, or other. It will be observed here that the light is moving to the left at a three-fold augmented rate of that of the disk D carrying the slots 9. Therefore, the relative speed of the light beam and the slot 9 is equal to the sum of their speeds. There is a shifting of the light beam projected through the slot to the right at a speed equal to the speed of the slot. There is a series of rapidly moving flat light beams moving to the right, the light of which is moving to the left at a much greater speed. The beam is made up of light that is taken from every portion of the image, and which therefore traverses the image at a very great speed. The slots produce a chopper effect, which is so desirable for television purposes. From the above, it will be understood that the image has been scanned in the form of a beam of rectangular cross section covering one dimension of the image. It is now necessary to explore the elemental areas of this rectangle by means of a spiral aperture, cylindrical lens, or the like. The light, after leaving the slot 9 enters prism A on the opposite side of disk D (see Figure 2). It is directed upward through the slot S which is in the form of a helix distributed around the periphery of the cylinder C. This helical slot S acts to completely explore the elemental portions of the rectangular beam, making a complete exploration for one turn of the cylinder.

Figure 2 is a cross-sectional view of disk D and cylinder C. This disk-cylinder is mounted upon shaft E driven by motor M, or its equivalent. The light is shown coming from prism 5 to lens 6 (not shown) and entering prism 7, from which it is reflected into prism 8. From prism 8 it is reflected into slot 9, or rather it is reflected upon the area traversed by slot 9, and the latter scans the beam in the form of a narrow rectangular laterally moving beam of light. This flat, narrow light beam is seen entering prism A, which reflects it upward through the lens B, which acts to prevent a too great diverging of the light beam so that the image may be focused in the plane of the element S. This flat beam of light is then projected upon the under surface of the cylinder C over the area traversed by the helical slot S, which has one turn disposed over the surface of the cylinder C. This slot permits a small approximately square beam of light to pass through to the photoelectric cell P. Lens B is not absolutely essential in certain modifications, and may be omitted. In this figure, it will be noted that the slot S acts to cause the continual shifting of the light beam which enters the photoelectric cell, to the right.

It would be quite desirable to rotate the disk in a horizontal position, as shown in Figure 4. It will be noted that the latter figure illustrates conventional scanning, that is, from top to bottom and from left to right.

Figure 3 is an elevational view of the right side of Figure 2. This figure is partly in cross section, the section being taken on the broken line shown in Figure 4. The light is shown coming from the image or object 1 and entering lens 2, which projects it into the prism 3. It is reflected back into lens 4, while its motion has been reversed. Lens 4 augments its speed of movement and reforms the image in prism 5. The latter sends it back with a reversed movement through lens 6, which gives it a further augmented speed of motion, and forms an image in prism 7 which reverses its direction and sends it into prism 8 (shown in Figure 2), which reflects the light over the area traversed by slot 9, which breaks it up into laterally moving, flat light beams. It then passes into prism A, which reflects it through lens B and slot S into photocell P. Lens B may be omitted, if desired.

A very important modification of the invention is as follows: The prism A as shown in Figure 2, may be omitted, with the result that the light beam does not pass upward, but passes horizontally to the right. The photoelectric cell with the lens B would then be placed in the path of this light beam and be directly actuated by it. In this modification, the lenses L, 6, 4, etc., should be helically arranged. The shifting of the scanning beam should then be performed by means of the helically arranged lenses.

Another modification covers the provision of a spiral or helical slot S having more than one turn throughout the cylindrical surface of C.

Figure 4 is a plan view of Figure 3. C is the cylinder carrying the lenses 2, 4, 6 and L, etc., and the helical slot S. This is here shown as a virtual slot, and the integrity of the cylinder C and slot S is maintained by means of flat, very thin metal braces e, which may be even an inch in width, while their thickness may be that of a razor blade. In this manner, the brace will obstruct very little light, while great rigidity will be given to the cylinder C. Of course, the cylinder C may be made of transparent material, and the surface covered with dark paint, dark paper, fabric, etc., or the cylindrical surface may be provided with a photographically produced representation of the helical slot S; or a cylindrical lens may be provided. Or, another modification covers the use of a neon or other glow lamp of helical form. This lamp may be activated in sections by cooperation with a commutator, or the like. The supporting disk is shown at D. The light from the image is received by 2, and passes downward to the prism, and upward through lens 4 and to prism 5 (not shown in this figure) and downward again through lens 6. Finally, prism 8 (shown in dotted lines) reflects this light through the slot 9 into prism A (shown in dotted lines). The flattened beam is in dotted lines cooperating with slot S. It will be noted that the result is the production of the intersecting point i, which shifts its position in such manner as to expose the successive elemental areas of the image. The flattened beams (indicated by the dotted lines) move to the right with great rapidity, while the slot S moves slowly from top to bottom. The area is thus scanned from top to bottom, and from left to right.

An objection to the loss of light caused by its passage through the various prisms may be offered. Therefore, instead of prisms being used for reflecting the light as described above, it is possible to use other modifications, such as that illustrated in Figure 5. a and b are two mirrors of any type desired. They may be very thin plate glass sheets, such as those used for polarizing light, which have been silvered; or they may be polished sheets of metal, such as monel metal, or other. A ground glass surface, or other screen, is shown at c, and is the same as that described in my application for Reflex scanning referred to above. This ground glass surface acts to provide a screen upon which the image is formed by the various lenses 2, etc., as described above. Its use is not absolutely essential. The dotted lines indicate that the image has been produced at the focal point indicated by the crossing of the dotted lines. The image is thus produced on the ground glass surface. The light coming from this image is reflected by the surface b and the resultant vertical portion is found to be moving in a direction opposite to that of the original light entering the reflecting means. The ground glass screen c may be omitted and the two mirrors a and b used alone.

Having described my invention, I claim as new and desire to secure by Letters Patent:

1. A scanning process consisting in forming a series of laterally moving images, changing the direction of travel of the light of said images through two 90 degree angles and reversing the direction of lateral movement of said images, reprojecting said images with a lateral movement similar to the original movement in order to produce an increased speed of lateral movement of said images and rapidly interrupting the light of said images.

2. A scanning process consisting in forming a series of laterally moving images, changing the direction of travel of the light of said images through two 90 degree angles and reversing the direction of lateral movement of said images, reprojecting said images with a lateral movement similar to the original movement in order to produce an increased speed of lateral movement of said images, again reversing the direction of travel and of lateral movement of said images and passing the light of said images through a series of light interrupting areas having a direction of movement opposite to said light.

3. A scanning process consisting in forming a series of laterally moving images, changing the direction of travel of the light of said images through two 90 degree angles and reversing the direction of lateral movement of said images, reprojecting said images with a lateral movement similar to the original movement of said images in order to produce an increased speed of lateral movement of said images, rapidly interrupting the light of said images, and passing said light through a rectangular light varying area of changing position.

4. A scanning apparatus consisting of a single moving medium, three groups of light modulating areas carried on said medium, a plurality of stationary light reflecting elements, one of said groups of light modulating areas cooperating with said light reflecting means to produce an increased rate of movement of a series of images, the second of said groups cooperating with said stationary elements constituting a chopping means for interrupting the light of said images repeatedly and the third of said groups cooperating with said stationary elements to produce a beam of light of equal dimensions having a speed greater than said moving medium.

5. A scanning apparatus consisting of a single moving medium composed of a disk and cylinder, a plurality of helically arranged lenses on said cylinder and a chopping means consisting of a plurality of slots on said disk, and stationary reflecting means in cooperative relation with said lenses and slots for passing light which has traversed said lenses consecutively through said slots.

6. A scanning apparatus consisting of a single moving medium composed of a disk and cylinder, a plurality of lenses arranged on said cylinder, a helical rectangular light limiting area also on said cylinder, a chopping means consisting of a plurality of slots on said disk, and a plurality of light reflecting means stationarily arranged about said moving medium acting to consecutively reflect the light through said lenses in order to produce an increased lateral movement of images formed by said lenses and to reflect said light through said slots to produce a chopper effect and through said helical area to produce a suitably limited and shifting light beam.

7. A single moving medium, a group of image forming elements carried on said medium producing a series of laterally moving images, a chopping means consisting of a group of light interrupting elements carried on said medium, a stationary group of reflecting elements acting to pass the light of said images consecutively through said image forming elements to increase the speed of movement of said images over that of the moving medium, and a stationary group of elements acting to pass the light of said images through said interrupting elements to produce a rapidly moving scanning light beam.

8. Means for interrupting a beam of light in a television apparatus consisting of a movable medium, a series of light permeable areas borne on said medium, said light permeable areas forming and moving a series of light beams in a definite direction, a series of chopper areas also borne on and moved by said medium, stationary means for reversing the direction of motion of said light beams and stationary means for diverting said light beams through said series of chopper areas while said light beams are moving oppositely to said chopper areas in order to produce a very rapid interruption of said light beams.

9. A scanning apparatus consisting of a movable medium, a series of image forming elements borne on and moved by said medium to form thereby a series of moving light beams, a series of chopper elements borne on and moved by said movable medium, stationary means including inclined reflecting surfaces for accelerating the speed of motion of said light beams and reversing the direction of motion thereof relative to said movable medium and means including an inclined reflecting surface for diverting said accelerated and reversed movement light beams through said chopper areas to produce a very rapid interruption of said light beams.

10. A scanning apparatus consisting of a movable medium, a series of light permeable areas borne on said medium, said areas transmitting and moving a series of light beams in a definite direction, a series of chopper areas also borne on and moved by said medium, stationary means for reversing the direction of motion of and for reflecting said light beams through said series of chopper areas, said reflected light beams and said chopper areas moving in opposite relative directions in order to produce a great interruption of said light beams and a stationary photoelectric element in cooperative relation with said interrupted light beams to convert said light beams into corresponding electric current.

11. A scanning apparatus consisting of a single rotatable element, a plurality of series of light permeable areas carried on and moved by said rotatable element, one of said series consisting of image forming elements arranged in image exploring relation which act to move a series of images, means for increasing the speed of and reversing the direction of motion of said images in cooperative relation with the light of said images and directing said light through a second of said series, the second of said light permeable areas consisting of chopping means in cooperative relation with the light of said images, said chopping means moving in a direction opposite to that of said images in order that the light constituting said images may be rapidly interrupted and a photoelectric element upon which the successive elemental areas of said images are impinged to produce an image modulated electric current.

12. A scanning apparatus consisting of a single rotatable element, a plurality of series of light permeable areas carried on and moved by said rotatable element, one of said series consisting of image forming elements arranged in image exploring relation which act to form and move a series of images, means for increasing the speed of and reversing the direction of motion of said images in cooperative relation with the light of said images and directing said light through a second of said series, said second series consisting of chopping means in cooperative relation with the light of said images, said chopping means moving in a direction opposite to that of said images in order that the light constituting said images may be rapidly interrupted, means for focussing and moving said images upon a third of said series of light permeable areas, said third series consisting of a longitudinal laterally moving light permeable area and a photoelectric element receiving the light from said images to produce an image modulated electric current.

13. A scanning apparatus consisting of a single rotatable cylinder, a rotatable disk fixedly attached to said cylinder at its mid portion, a first series of light permeable areas borne on one lateral half of said cylinder, a second series of light permeable areas borne on said disk, stationary reflecting means for causing light which has traversed said first series to traverse said second series, a third series of light permeable areas borne on the other lateral half of said cylinder, stationary means for reflecting light which has traversed said second series through said third series and a stationary photoelectric element in cooperative relation with said light after it has traversed said third series.

14. A scanning element consisting of a rotatable cylinder, two series of light permeable areas arranged on different lateral portions of the surface of said cylinder, each of said series being composed of a type of light permeable area different from that of the other series, a rotatable disk fixedly attached to said cylinder along a line situated between said series of light permeable areas and a third series of different type of light permeable areas carried on said disk.

15. A scanning apparatus consisting of a rotatable cylinder, two series of light permeable areas arranged on different lateral portions of the surface of said cylinder, each of said series being composed of a type of light permeable areas different from the other series, a rotatable disk fixedly attached to said cylinder along a line situated between said series of light permeable areas, a third series of still different light permeable areas carried on said disk and a plurality of stationary means including an inclined reflecting surface for consecutively reflecting light beams successively through each of said series of light permeable areas to obtain a beam that is modified as to form and movement for scanning purposes.

16. A scanning apparatus in accordance with claim 5 in which a photoelectric cell is disposed so as to be influenced by the light which has traversed said chopping means.

17. A scanning apparatus in accordance with claim 13 in which said stationary reflecting means consists of two reflecting surfaces disposed one on each side of said disk and inclined towards the surface of said disk and said cylinder.

ALOYSIUS J. CAWLEY.